United States Patent [19]

Katerberg et al.

[11] Patent Number: 4,972,201

[45] Date of Patent: Nov. 20, 1990

[54] DROP CHARGING METHOD AND SYSTEM FOR CONTINUOUS, INK JET PRINTING

[75] Inventors: James A. Katerberg, Kettering; David N. Pipkorn, Centerville, both of Ohio

[73] Assignee: Eastman Kodak Company, Rochester, N.Y.

[21] Appl. No.: 451,850

[22] Filed: Dec. 18, 1989

[51] Int. Cl.[5] .............................................. G01D 15/18

[52] U.S. Cl. .......................................... 346/1.1; 346/75

[58] Field of Search .................................... 346/1.1, 75

[56] References Cited

U.S. PATENT DOCUMENTS 4,616,234 10/1986 Wint ...................................... 346/75

*Primary Examiner*—Bruce A. Reynolds

*Assistant Examiner*—Gerald E. Preston

*Attorney, Agent, or Firm*—John D. Husser

[57] ABSTRACT

A method for avoiding drop charge switching errors in continuous ink jet printing of the kind using stimulation to regulate ink drop break-off of a linear array of ink streams. The method includes the steps of: controlling ink drop stimulation so that the phase distribution of drop break-off along the length of the ink stream array remains stable in time and charging stimulated drop streams in at least two different groups during at least two different address periods which are offset in phase so that all drop streams are addressed during a drop break-off condition.

13 Claims, 5 Drawing Sheets

FIG. 1
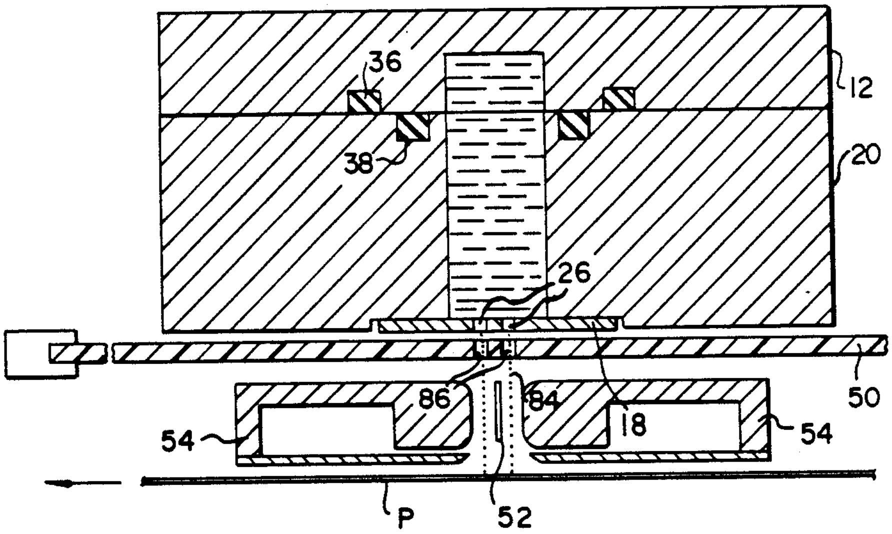
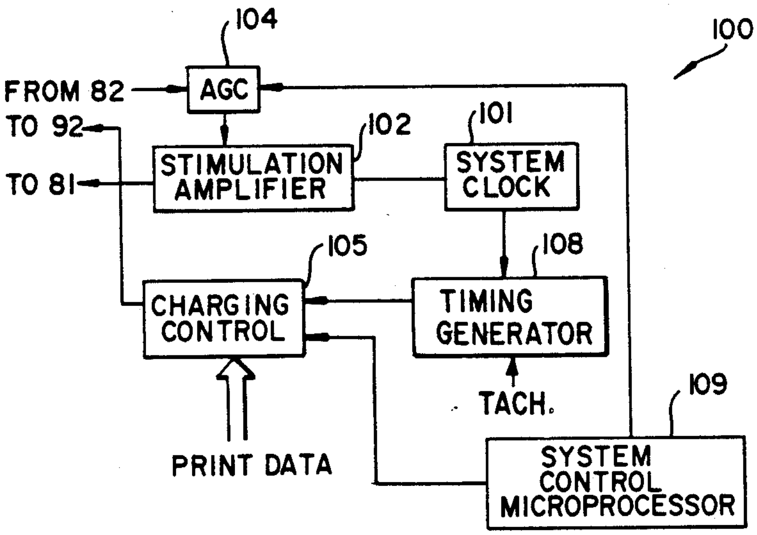
FIG. 3

FIG. 6
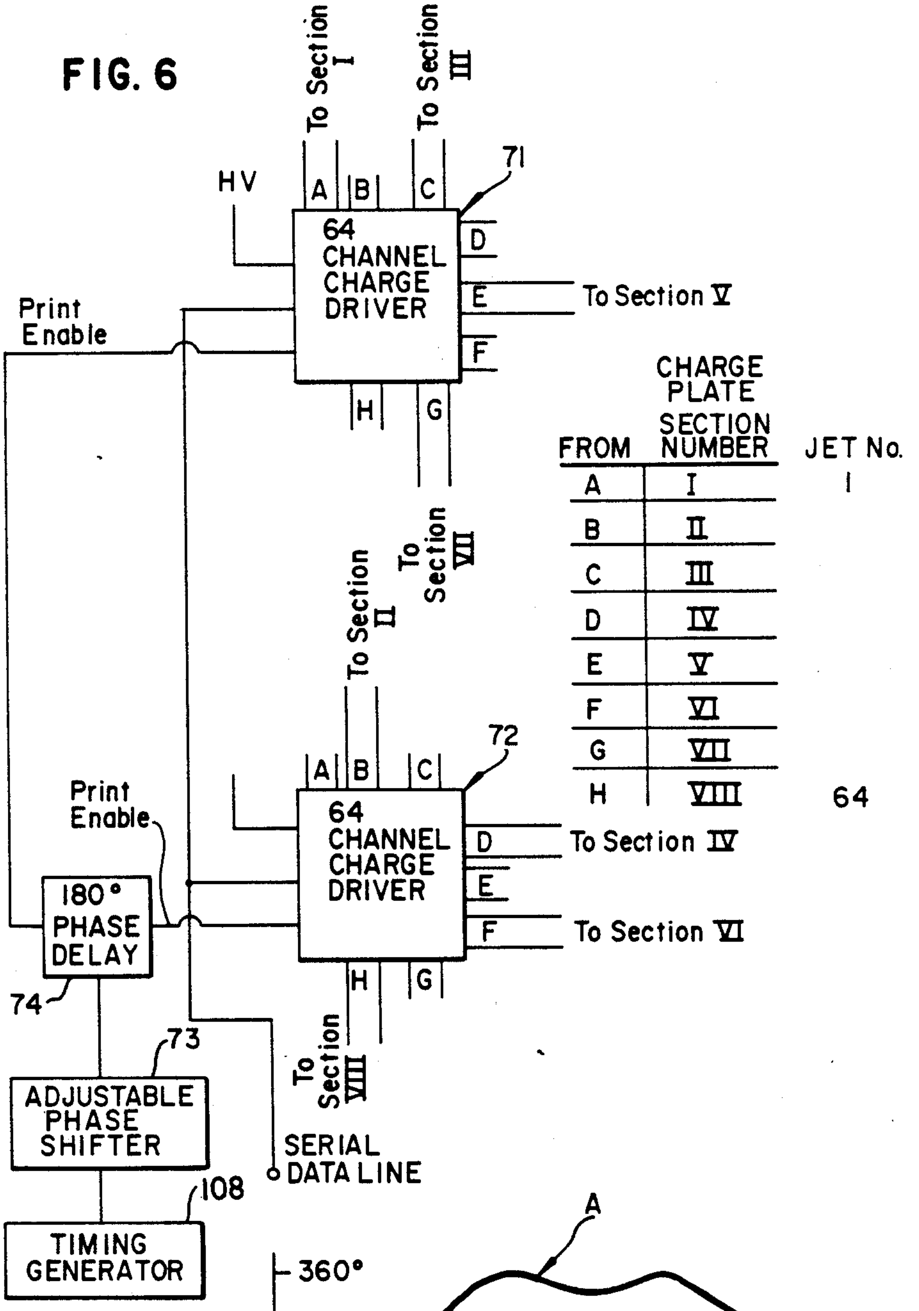
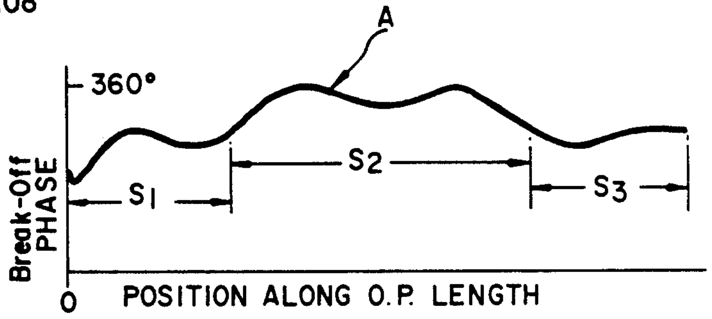
FIG. 7

DROP CHARGING METHOD AND SYSTEM FOR CONTINUOUS, INK JET PRINTING

FIELD OF INVENTION

The present invention relates to continuous ink jet printers of the kind wherein drop break-up is regulated by stimulation and, more specifically, to improved drop charging methods and systems for such printers.

BACKGROUND ART

In the binary form of continuous ink jet printing ink is directed, under pressure, through an array of orifices (formed in an orifice plate) to produce a plurality of ink jet filaments directed toward a print zone. The orifice plate is stimulated (e.g. by vibration) to regulate the break-up of the filaments into droplet streams. The stimulation ensures that each of the drops formed from a given filament break-off at essentially the same phase relative to the plate vibration or stimulation source. While some stimulation means, such as U.S. Pat. No. 4,683,477, are intended to produce substantially the same break-off phase for all jets in the array, the break-off phase varies significantly from jet to jet with traveling wave stimulation such as is described in U.S. Pat. No. 3,739,393.

Drop charge electrodes are located adjacent the drop break-off regions of respective filaments, and when energized with a voltage, induce a charge of opposite polarity on the drops that are then breaking off the filament ends. The energization of drop charge electrodes is controlled by cyclic gating of groups of "on" or "off" information signals to electrode drivers. Typically, charged drops are deflected to a catcher device and uncharged drops pass on to the print surface.

The charge electrode driving electronics is designed for a normally biased condition, i.e. normally catch drop producing. To produce a print drop on the charge electrode, voltage must be dropped to near zero volts for an interval which includes the drop break-off. For drop generators, such as U.S. Pat. No. 4,683,477, which produce substantially uniform drop break-off phases for all jets in the array, the print pulses are applied (as needed) at a common phase relative to the stimulation source. By properly phasing the print pulse, using one of many known procedures for determining the proper phase, drops from all the jets in the array can be properly controlled.

Drop generators employing traveling wave stimulation produce drop break-offs at essentially all phase angles relative to the stimulation source. Print pulses which are at constant phase relative to the stimulation source are likely to produce bands of print defects parallel to paper motion. The bands of defects correspond to drops breaking off with phases outside the print pulse or with phases corresponding to the transient leading and trailing edges of the print pulse. While the print pulse width can be increased to 360° wide to ensure that no jets have drop break-off outside the print pulse, there is always a possibility of jets with drops breaking off during the pulse transients. Even though the charging voltage is changing very rapidly during the transient, drops with break-off during the transient are charged in various amounts from near zero charge (corresponding to the print drops) up to the charge of the catch drops. The partially charged drops may be caught if the drop charge is high, or they may strike the print media as an improperly deflected print drop.

Thus, a problem with prior art traveling wave stimulation printers (with their non-synchronous drop break-off) is that they have several jets along the array with drops breaking-off in the switching interval. Rather than try to eliminate such switching period drop errors, the prior art printers have used designs which randomize these "switching" errors. For example, by clocking the phase of the address cycles only from a print medium tachometer signal, with no reference to the phase of traveling wave stimulation, there is produced a randomization of the location of the switching period drop defects. By randomizing the defect locations, defects may be less objectional than if located in one or more bands across the print.

While helpful to some extent, the prior art randomizing approach still results in many stray dots on the print medium. Also, the number of drops per pixel printed will not be uniform. This produces banding in large area prints, especially half tones, as well as dot size variation in printed dot matrix characters.

Many long array, plane wave drop generators also will produce substantial drop break-off phase variation across the array. With such drop generators the large break-off phase variation can make it impossible or very difficult to choose a print pulse phase which does not produce some switching transient related print defects.

SUMMARY OF THE INVENTION

The object of the present invention is to provide for continuous ink jet printers that employ stimulation, a drop-charge approach that avoids the above-noted problems of prior art devices and substantially reduces the switching error defects on output print medium. Thus, one advantage of the present invention is that printing can be effected without stray print drop defects incident to the uncontrolled printing of switching period drops.

The present invention constitutes an improved method for setting the phase of the printing pulses relative to the stimulation of a continuous ink jet printer. The method comprises the steps of: (1) stimulating ink jets with a drop generator having a consistent, reproducible break-off phase profile across the array; (2) dividing or segmenting the array of drop charging electrodes into groups such that the drop break-off phase variation for the corresponding jets in each segment is small enough to allow switching errors to be avoided within the segment for a range of print pulse phases; and (3) defining and fixing the phase between the printing pulses used by each segment so that the printing pulses of each segment are approximately centered around the break-off time for the jets in the segment. While maintaining the relative phase difference between the printing pulses of the various segments, the phase of the print pulse for all segments can be shifted together, relative to the stimulation source, to track changes in the break-off phase.

BRIEF DESCRIPTION OF DRAWINGS

The subsequent description of preferred embodiments refers to the accompanying drawings wherein:

FIG. 1 is a cross-sectional view of one ink jet printer system in which the present invention can be utilized;

FIG. 3 is a circuit block diagram of the machine control for the FIG. 1 printer system;

FIG. 6 is a block diagram illustrating one preferred drop charge control system in accord with the present invention; and FIG. 7 is a diagram useful in explaining another embodiment of the present invention.

DETAILED DESCRIPTION OF PREFERRED EMBODIMENTS

Figure 2:
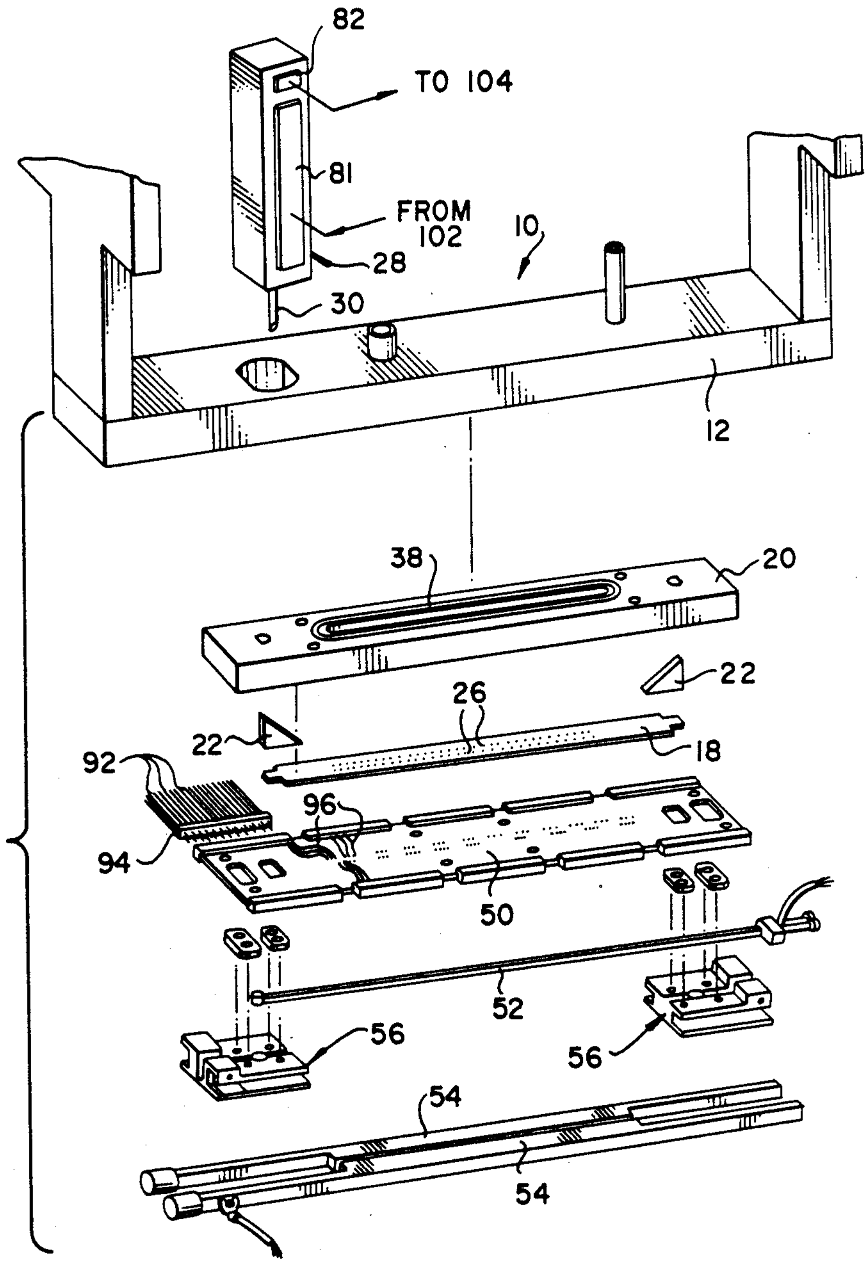
FIG. 2 is an exploded perspective view of a portion of the FIG. 1 system.

The ink jet printer system shown in FIGS. 1 and 2 is of the continuous type and employs traveling wave drop stimulation. Referring to those Figures, it will be seen that the various elements of a print head assembly 10 are assembled by attachment to a support bar 12.

The assembly comprises an orifice plate 18 bonded to fluid supply manifold 20 with a pair of wedge-shaped acoustical dampers 22 at the ends of the orifice plate. Orifice plate 18 contains two rows of orifices 26 and is stimulated by a stimulator 28, which is mounted into support bar 12 and includes a stimulation probe 30 that extends through the manifold 20 and into direct contact with one end of orifice plate 18. The stimulator 28 includes piezoelectric transducers 81 and 82 to create and monitor the probe vibration. Orifice plate 18, manifold 20, support bar 12 together with O-rings 36 and 38 comprise a clean package which may be preassembled.

Other major elements of the print head are a charge ring plate 50, an electrically conductive deflection ribbon 52, clamping assemblies 56 and a pair of catchers 54. The fully assembled recording head is shown in cross section in FIG. 1. As illustrated ink I flows downwardly through the manifold 20 and is ejected through orifices 26, forming two rows of streams which break up into two curtains of drops 84. Drops 84 then pass through two rows of charge rings 86 in charge ring plate 50 and thence into one of the catchers 54 or onto the moving web of paper P.

Formation of drops 84 is closely controlled by application of constant frequency, controlled amplitude, stimulating disturbance to each of the fluid streams emanating from orifice plate 18. Disturbances for this purpose may be set up by operating transducer 28 to vibrate probe 30 at constant amplitude and frequency against plate 18. This causes a continuing series of bending waves to travel the length of the orifice plate, each wave producing drop stimulating disturbances each time it passes one of the orifices 26. Dampers 22 prevent reflection and repropagation of these waves.

As each drop 84 is formed it is exposed to the charging influence of one of the charge rings 86. If the drop is to be deflected and caught, an electrical charge is present on the associated charge ring 86 for a time interval including the instant of drop formation. This causes an electrical charge to be induced in the tip of the fluid filament and carried away by drop. As the drop traverses the deflecting field set up between ribbon 52 and the face of the adjacent catcher it is deflected to strike and run down the face of the catcher, where it is ingested, and carried off. Drop ingestion may be promoted by application of a suitable vacuum to the ends of catchers 54.

Appropriate conditions for accomplishment of the above mentioned drop charging are established by setting up an electrical potential difference between orifice plate 18 (or any other conductive structure in electrical contact with the ink supply) and each appropriate charge ring 86. These potential differences are created by grounding plate 18 and maintaining charge voltages on charge rings 86 at appropriate times (via wires 92, connectors 94 and printed circuit lines 96). Deflection of drops to be caught is accomplished by setting up appropriate electrical fields between deflection ribbon 52 and each of the catchers 54.

The printer machine control system 100 includes a system clock circuit 101 and a stimulation amplifier circuit 102, which cooperate with automatic gain control circuit 104 and microprocessor 109 to regulate stimulation amplitude and phase. Timing generator 108 receives a tachometer input signal indicative of the print medium velocity and a stimulation clock signal and produces an output pulse train of fixed phase with respect to the stimulation source and of frequency determined by the tachometer signal. The control system 100 also includes a charging control circuit 105, which cooperates with timing generator 108 and microprocessor 109 to effect energization of charging rings 86 in accord with received print data and in proper timed relation with stimulation according to the present invention.

As noted above, in traveling wave stimulation the orifice plate 18, which is secured at all its edges to rigid housing 20, is caused to vibrate by stimulation transducer pin 30. This orifice plate vibration, which is initiated at one end of the jet array, propagates as a wave down the orifice plate. The orifice plate, with its boundaries defined by its holders, serves as a waveguide for the propagation of the flexure wave down the jet array. The finite propagation speed down the array, which is a function of orifice plate thickness, width, and material, produces a phase shift in the drop break-off from jet to jet. Attenuation of the flexure wave causes the vibration amplitude to decrease down the array and can cause additional break-off phase shift.

One exemplary orifice plate 18 such as shown in FIG. 2, has 64 orifices per row. The orifice plate has a thickness of 8 mil and a width between attachment solder fillets of 0.190". The fillets are kept small ($<10$ mil) at each edge to minimize attenuation. The dampers 22 at the ends of the array keep the reflections of the traveling wave from the ends of the cavity to less than 2–3%. Reflections larger than this amount make it more difficult to carry out charging segmentation in accord with the present invention, due to the resulting modulation in stimulation amplitude down the length of the array. The exemplary waveguide construction described above, when stimulated at 50 kHz, produce a stable-in-time phase shift of about 1440° ($4\times360°$) down the 1" orifice array length. This phase shift is a result of the wave speed and wave attenuating and is consistent and responsible for the described construction.

Figure 4:
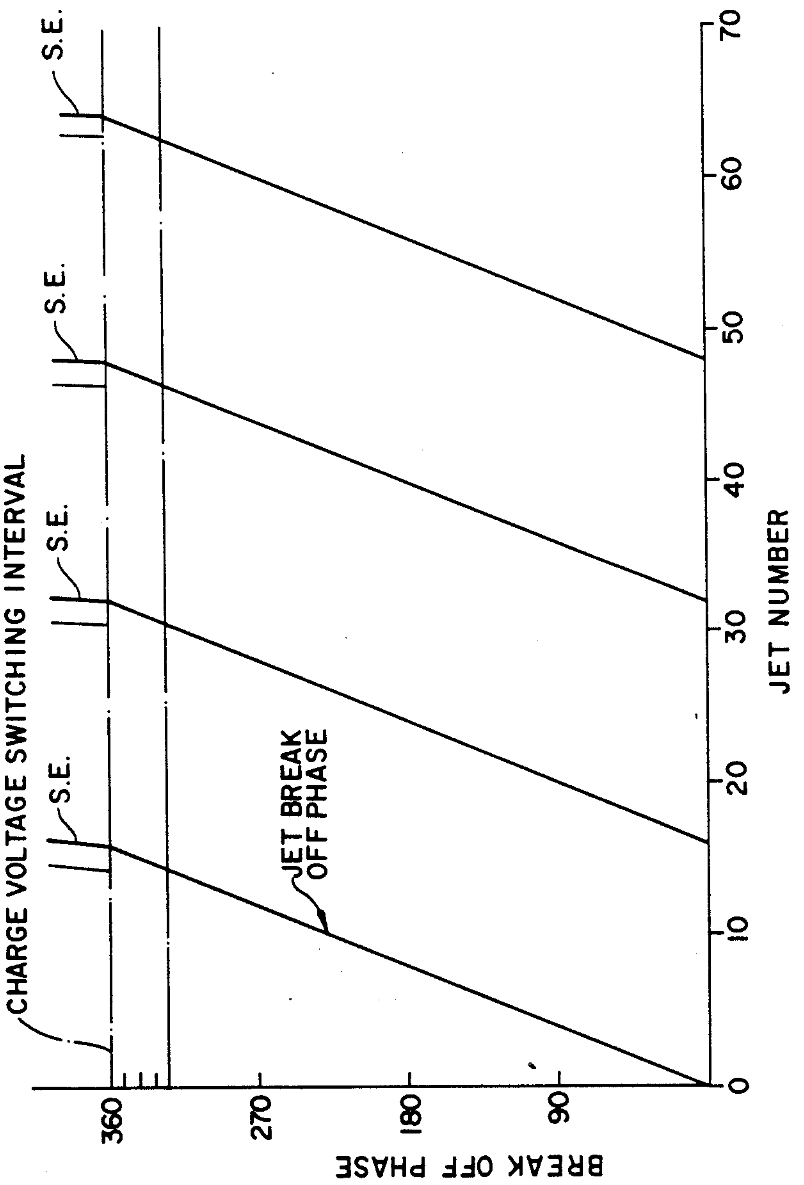
FIG. 4 is a diagram illustrating the problem which the present invention is directed to solve.
Figure 5:
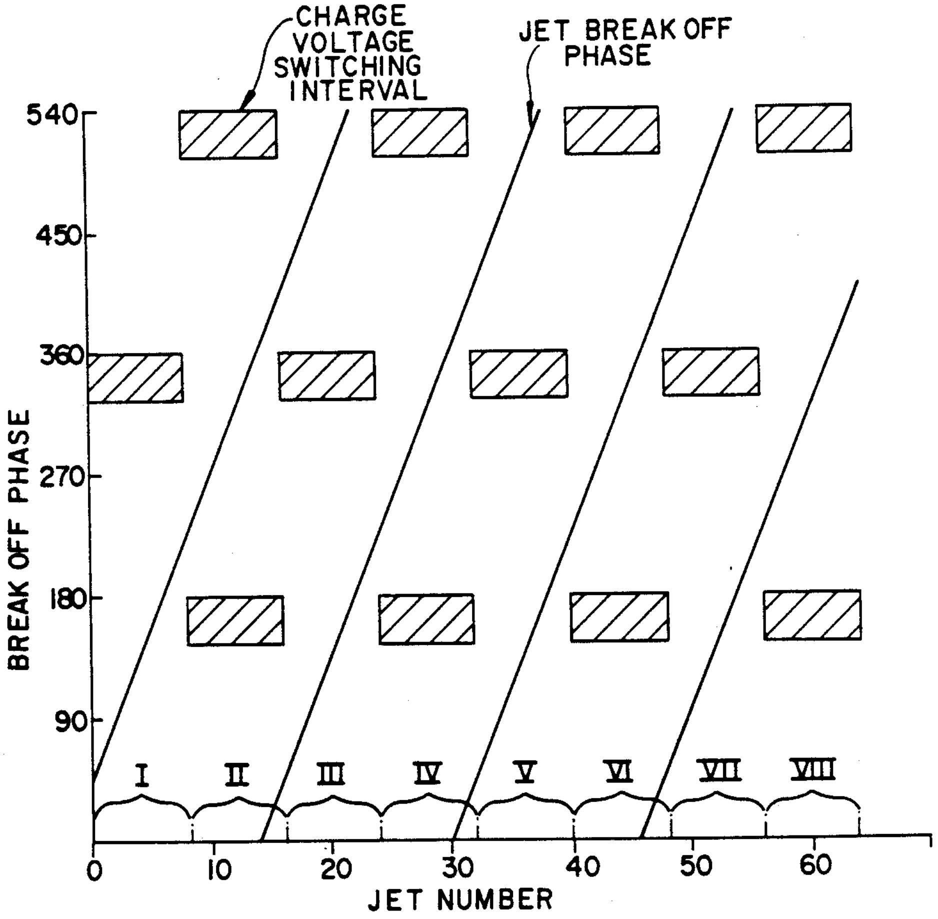
FIG. 5 is a diagram useful in explaining the operation of an exemplary control system according to the invention.

As shown in FIG. 4, even though the phase shift is consistent, such a traveling wave print head, without phase-shifted segmented charging in accord with the present invention, would produce several regions of switching errors (denoted S.E.) across the array. If, however, the charging electrodes relating to jets residing within each of these switching error regions S.E. had their print pulse shifted, e.g. by 180° as shown in FIG. 5, there would be no switching errors. This is the general concept of segmented synchronizing in accord with the present invention.

Segment size refers to the number of adjacent ink jets within a group allocated a common charging phase and various segment sizes can be used in producing the present invention. One convenient form of segmented synchronizing illustrated in FIG. 5, has eight groups each comprising eight jets, and the odd number segments (groups) have a 180° phase shift of the drop charging cycle relative to the even number segments. In accord with the present invention the printer system is configured and/or regulated so that the print pulses of respective groups are approximately centered vis a vis the break-off times of the jets comprising the groups. In one preferred embodiment, while maintaining a selected drop charging cycle phase difference between odd and even segments (such as shown in FIG. 5), the drop charging cycle phases of the segments can be shifted together, relative to the phase of jet stimulation, to eliminate switching errors. Such shifting capability can be used at initial start-up operation or to compensate for (i.e. track) changes in drop break-off phase.

One charge control circuit which can be used for segmented synchronizing, as illustrated in FIG. 5, is shown in FIG. 6. In this embodiment, the same print data in serial form is supplied to each of two charge drivers 71, 72 (which include conventional serial to parallel data conversion circuits and the high voltage switches). Alternating eight channel sections A to H from each charge driver are connected to the charge plate segments I–VIII in the sequences illustrated in FIG. 6. The unused channels of each charge driver are left open, or can be terminated to minimize electrical noise. Print enable signals are provided from timing generator 108 in integer numbers of stimulation periods. The print enable signal to driver circuit 72 is provided with a 180° phase delay by circuit 74. Adjustable phase shift circuit 73 is provided to allow both the print enable signals to be shifted in synchronism by the operator (vis a vis the jet stimulation) to eliminate the conditions of drop break-off during a switching period. Thus, referring to FIG. 6, it can be seen that driver 71 actuates eight segment groups I, III, V, and VII and driver 72 actuates segment groups II, IV, VI, and VIII with a 180° phase difference.

While FIG. 6 electronics separates the eight channel groups on the output of two phase-separated charge electrode driver circuits, the same function can be attained in other ways, e.g. by a sorting of the serial data stream. Such a sorting of the input data stream can eliminate the need for the unused output channels of the FIG. 6 example, and can allow 32-channel charge drivers to be used instead of 64-channel drivers.

While the embodiment described above employs 8 channel segments, which are appropriate for the waveguide geometry described, some printer applications may require different waveguide geometries that will produce different drop break-off profiles. For such applications, a plot of the drop break-off phase versus jet number down the array (such as in FIG. 4) is useful for determining an appropriate segmentation. Although uniform eight-jet-width segments is appropriate for the exemplary geometry described above, some waveguide geometrics may require a variation in segment size from one end of the array to another. The embodiment described above provides 180° phase shifts between the print pulses of segments; however, it will be understood that other phase shifts may be used and more than two print pulse phase options may be employed where appropriate for a given waveguide geometry.

For segmented synchronization as described above, it is preferred that the break-off phase profile remain consistent with the chosen segmentation from one manufactured drop generator to another. For the exemplary case this consistency can be maintained by appropriate process control in the manufacture of the orifice plate (modulus and thickness) and in soldering the orifice plate to the manifold (solder fillet uniformity and width).

While the invention has been described above in printing embodiments employing traveling wave stimulation of the orifice plate, it can be useful also in certain embodiments employing plane wave orifice plate stimulation. For example, in relatively longer orifice plate embodiments, plane wave resonator acoustics can produce phase variations which are consistent, but large enough to cause switching errors of the drop charging. The segmented charging approach of the present invention can be used by matching the segment size and phase shift between segments to the characteristics of such a plane wave stimulator.

FIG. 7 illustrates a three segment implementation of this approach wherein the curve A illustrates the phase of drop break-off along the length of a plane wave stimulated orifice plate. In accord with the present invention the address of drop charge electrodes corresponding to the orifice sectors $S_1$ and $S_3$ can be offset in phase approximately 90° with respect to the address of the drop charge electrodes corresponding to orifice sector $S_2$.

The invention has been described in detail with particular reference to preferred embodiments thereof, but it will be understood that variations and modifications can be effected within the spirit and scope of the invention.

We claim:

1. A method for synchronizing the phase of the continuous ink jet printing pulses relative to the ink jet stimulation, said method comprising the steps of:

(a) stimulating the ink jets with a drop generator having a consistent, reproducible break-off phase profile across the array;

(b) dividing the array of charging electrodes into groups such that the drop break-off phase variation of corresponding group jets is small enough to allow switching errors to be avoided; and (c) defining the phase shift(s) between the print pulses of respective groups so that each group print pulse is approximately centered with respect to the break-off times for the jets of its group.

2. The invention defined in claim 1 further comprising maintaining the relative phase shift(s) between the print pulses of the various groups and shifting the phase of the print pulses of all groups relative to the stimulation source to track changes in the break-off phase.

3. The method defined in claim 1 wherein said jet stimulating step comprises traveling wave stimulation.

4. The method defined in claim 1 wherein said jet stimulating step comprises plane wave stimulation.

5. The method defined in claim 3 wherein said jet-/electrode groups have equal numbers of jet/electrode units.

6. The method defined in claim 3 wherein the phase shift between adjacent groups is 180°.

7. An improved method for continuous ink jet printing using wave stimulation of a linear ink jet array to regulate ink drop break-off, said method comprising the steps of:

(a) controlling ink drop stimulation so that the phase distribution of drop break-off along the length of the array remains stable in time; and (b) charging stimulated drop streams in at least two different groups during at least two different address periods which are offset in phase so that all drop streams are addressed during a drop break-off condition.

8. In an ink printer of the kind adapted to print on successive line regions of a print media during respective line print periods and having: (i) an orifice plate comprising an orifice array for producing a plurality of ink jets, (ii) means for imparting drop break-off stimulation to said ink jets, and (iii) a plurality of selectively addressable charge electrodes located proximate said orifice plate along the drop break-off region of such ink jets, an improved drop charge control system comprising:

(a) a plurality of driver means for respectively responding to print data different signals to energize their related charge electrode; and (b) means for selectively enabling said driver means in at least two groups, respectively at different phases during each line print period, whereby all ink jets are addressed during a drop break-off condition.

9. The invention defined in claim 8 wherein said selective enabling means comprises a means for delaying the gating of one of said driver means groups with respect to the gating of said other said driver means segments.

10. The invention defined in claim 8 wherein said selective enabling means comprises means for loading data into said driver means in successive discrete portions corresponding respectively to said different groups and means for gating said driver means after each successive data loading.

11. The invention defined in claim 8 further comprising means for shifting the phase of said driver enabling means relative to the stimulation phase, while maintaining the phase delay therebetween.

12. A method of ink jet printing with a linear array(s) of ink jet streams comprising the steps of:

(a) producing and stimulating such streams so as to have a break-off phase profile along the length of the array(s) which is stable in time; and (b) controlling the drop charging pulses for such streams to occur in a plurality of different groups that respectively differ in drop charge phase so as to be approximately centered respectively vis a vis the drop break-off times of different ink jet stream groups that have differing group break-off phase.

13. The method defined in claim 11 further comprising shifting the drop charge phase of such groups relative to the stimulation phase while maintaining the difference in drop charge phase between groups.

* * * * *